US012650102B2

(12) United States Patent
Dudar et al.

(10) Patent No.: US 12,650,102 B2
(45) Date of Patent: Jun. 9, 2026

(54) METHOD AND SYSTEM FOR COMBINING TWO OR MORE CARBON FILLED FUEL VAPOR STORAGE CANISTERS

(71) Applicant: Ford Global Technologies, LLC, Dearborn, MI (US)

(72) Inventors: Aed M Dudar, Canton, MI (US); Scott Alan Bohr, Novi, MI (US); David Ballheim, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 330 days.

(21) Appl. No.: 18/338,630

(22) Filed: Jun. 21, 2023

(65) Prior Publication Data
US 2024/0426265 A1     Dec. 26, 2024

(51) Int. Cl.
*F02M 25/08*         (2006.01)
*B01D 53/04*         (2006.01)

(52) U.S. Cl.
CPC ..... *F02M 25/0854* (2013.01); *B01D 53/0415* (2013.01); *B01D 53/0446* (2013.01); *F02M 25/0872* (2013.01); *B01D 2253/102* (2013.01); *B01D 2259/402* (2013.01); *B01D 2259/4516* (2013.01); *F02M 25/0836* (2013.01)

(58) Field of Classification Search
CPC ............ B01D 53/0415; B01D 53/0446; F02M 25/0854; F02M 25/0872; F02M 25/089
See application file for complete search history.

(56) References Cited

U.S. PATENT DOCUMENTS 6,955,159 B2 * 10/2005 Ogawa ............... F02M 25/0854
                                                123/519
2016/0273495 A1    9/2016 Yamamoto et al.

FOREIGN PATENT DOCUMENTS

CN       201769678 U     3/2011
JP       2019105203 A    6/2019

OTHER PUBLICATIONS

Foote, B., "Ford Plug-In Hybrids Still Allowed Under New 2035 Carb Ruling," Ford Authority Website, Available Online at https://fordauthority.com/2022/08/ford-plug-in-hybrids-still-allowed-under-new-2035-carb-ruling/, Aug. 26, 2022, 1 page.

* cited by examiner

Primary Examiner — Sharon Pregler
(74) Attorney, Agent, or Firm — McCoy Russell LLP

(57) ABSTRACT

Methods and systems are presented for combining two or more common fuel vapor storage canisters to increase storage volume for fuel vapors of a vehicle. In one example, a fuel vapor manifold is constructed to permit communication between ports of carbon filled fuel vapor storage canisters. The fuel vapor manifold is a clam shell design that permits vibration welding.

10 Claims, 11 Drawing Sheets

METHOD AND SYSTEM FOR COMBINING TWO OR MORE CARBON FILLED FUEL VAPOR STORAGE CANISTERS

FIELD

The present description relates generally to methods and systems for combining two or more carbon filled fuel vapor storage canisters into a group of working carbon filled fuel vapor storage canisters.

BACKGROUND/SUMMARY

Some vehicles may include large fuel tanks to store fuel so that they may travel long distances and/or operate at high loads for a longer period of time. A large amount of fuel vapor may be generated when a large fuel tank is being refilled. In order to keep these fuel vapors from being released to atmosphere, the fuel vapors may be captured. One way to capture the fuel vapors is to have the refilling station capture the vapors; however, since many fuel pumps are self-serve, they may not be operated properly to capture fuel vapors from all vehicles. Another way to capture the fuel vapors is to capture the fuel vapors on board the vehicle that is being refueled. Capturing the fuel vapors onboard the vehicle allows the vehicle to capture fuel that is being paid for and special training to capture the fuel vapors may not be needed. However, larger fuel tanks may necessitate use of larger volume carbon filled fuel vapor storage canisters to capture larger amounts of fuel vapors. Of course, larger volume fuel vapor canisters may be generated, but monetary expenses and time to generate new carbon filled fuel vapor canisters may be prohibitive. Therefore, it may be desirable to use an existing carbon filled fuel vapor canister design to meet fuel vapor storage needs. Yet, coupling a large number of carbon fuel vapor storage canisters to yield sufficient volume to capture fuel vapors may increase chances for breaches in the storage system and large numbers of expensive quick connectors, hoses, and fittings. Therefore, it may be desirable to provide a way of aggregating a plurality of carbon filled fuel vapor storage canisters of the same type into a system that is capable of storing a large amount of fuel vapor at lower financial expense and with a lower propensity for breach.

The inventors herein have recognized the above-mentioned issue and have developed a fuel vapor manifold, comprising: a first half configured to receive a first carbon filled fuel vapor storage canister and a second carbon filled fuel vapor storage canister, the first half configured to receive a first nipple of a first fuel vapor storage canister, a second nipple of the first fuel vapor storage canister, a third nipple of a second fuel vapor storage canister, and a fourth nipple of the second fuel vapor storage canister.

By constructing a fuel vapor manifold, a plurality of common carbon filled fuel vapor storage canisters may be combined in parallel and series to increase fuel vapor storage capacity without having to build unique carbon filled fuel vapor storage canisters for each fuel tank volume. Additionally, the actual total number of connectors and hoses to link common carbon filled canisters may be reduced, thereby lowering a possibility of breaches within the fuel vapor storage system.

The present description may provide several advantages. In particular, the approach may lower expenses for increasing volume of carbon filled fuel vapor storage canisters. Additionally, the approach provides for parallel and serial arrangements for carbon filled fuel vapor storage canisters, which may allow a flow rate of fuel vapors over carbon to be managed so that there is sufficient time for the carbon to store the fuel vapors. Further, the approach provides for a mounting system that limits motion between the various components of the system to further reduce a possibility of system breaches.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
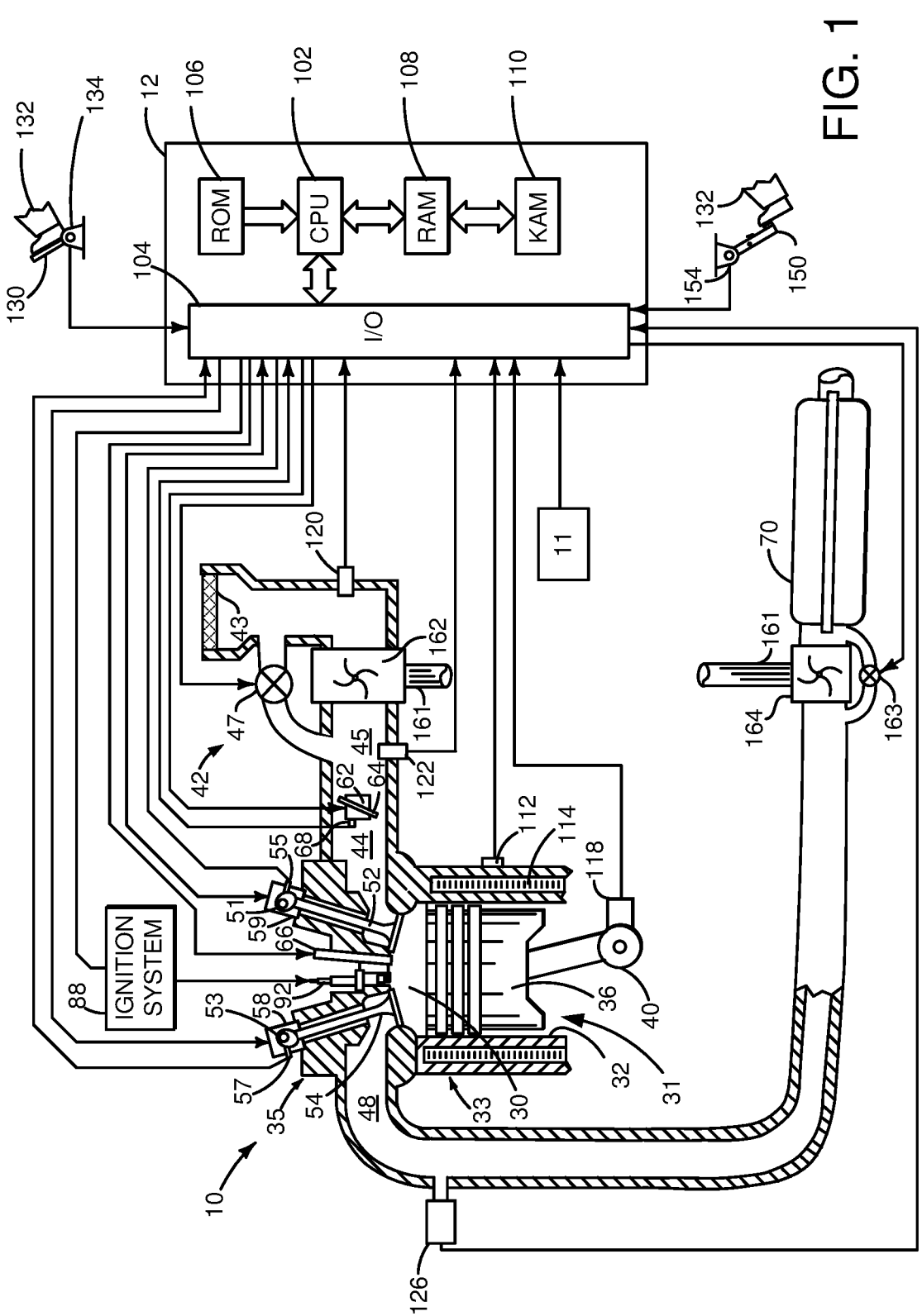
FIG. 1 shows an example engine with its associated evaporative emissions system.
Figure 2:
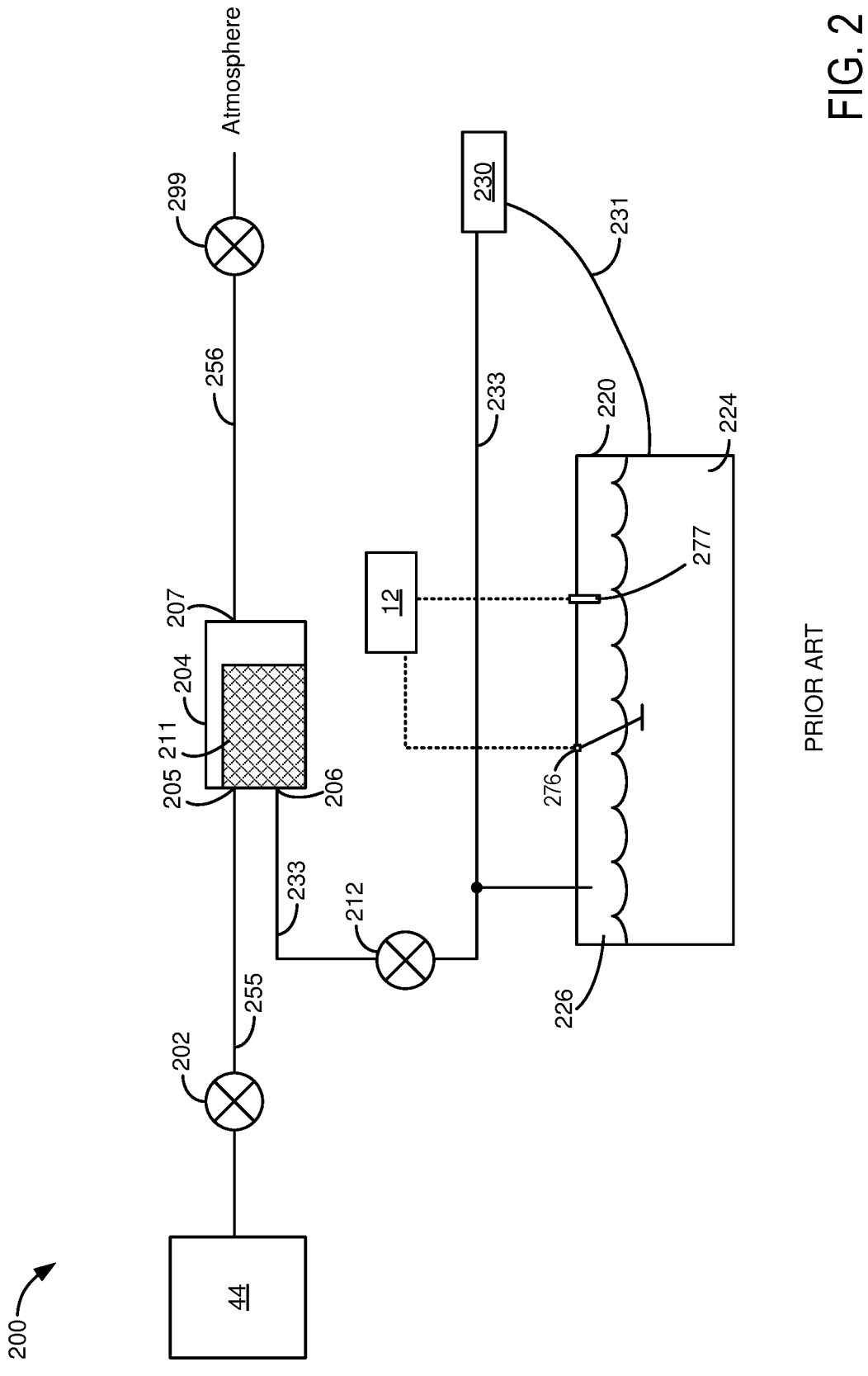
FIG. 2 shows an example prior art evaporative emissions system.
Figure 13:
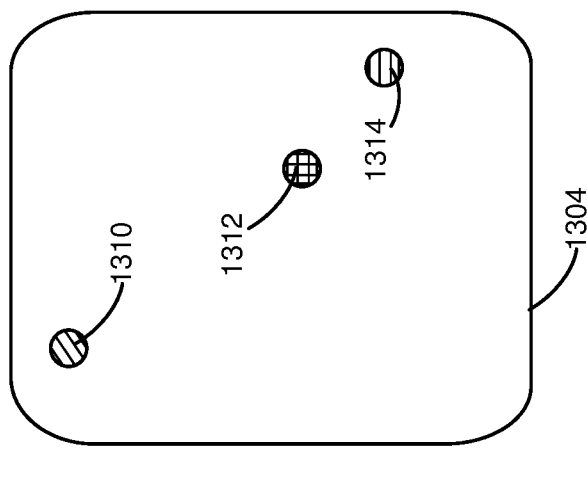
Figure 13:
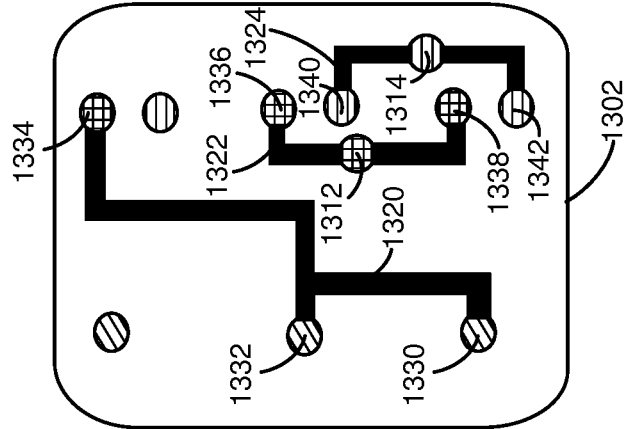
Figure 13:
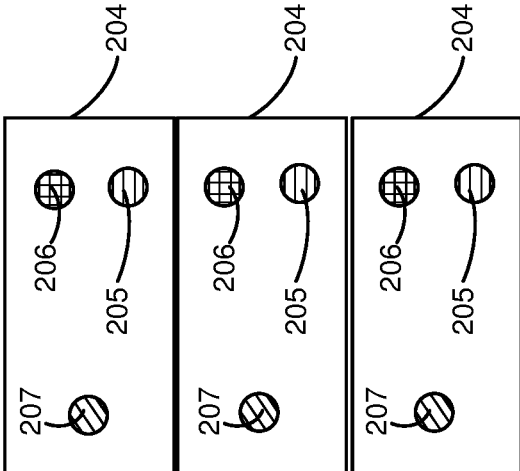
Figure 13:
Figure 14:
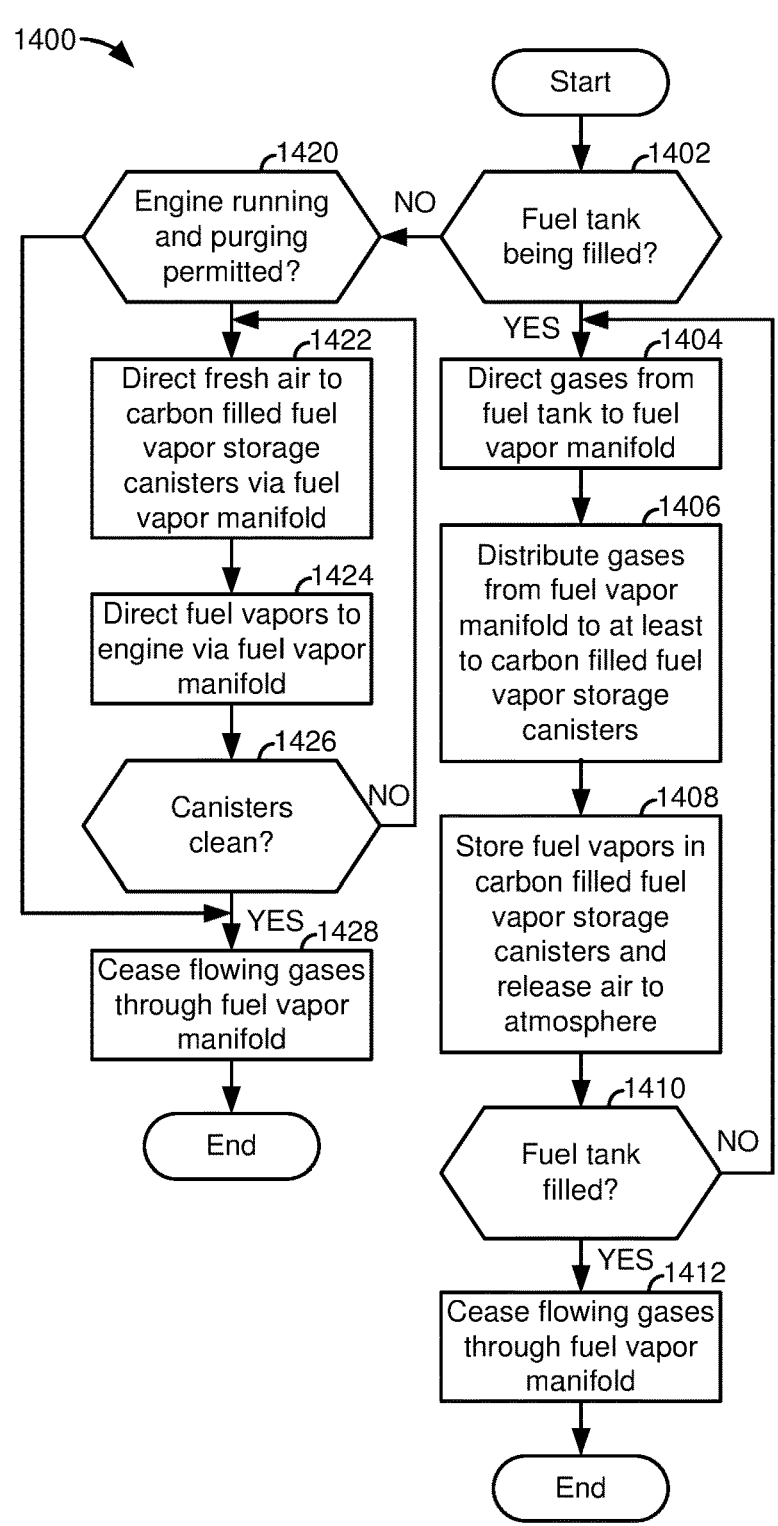
FIG. 14 is a flowchart of a method for operating an evaporative emissions system of a vehicle.

The following description relates to systems and methods for operating a vehicle and an evaporative emissions system. The vehicle may be a heavy duty vehicle that has a large fuel tank. The vehicle may include an engine of the type that is shown in FIG. 1. A prior art evaporative emissions system is shown in FIG. 2. Example evaporative emissions systems according to the present disclosure are shown in FIGS. 3-13. An example method for operating the evaporative emissions systems disclosed herein is shown in FIG. 14.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1-13. The controller may employ the actuators shown in FIGS. 1-13 to adjust engine and evaporative emissions system operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. The intake and exhaust valves may be deactivated in a closed position so that the intake and exhaust valves do not open during a cycle of the engine (e.g., four strokes). Valve activation devices 58 and 59 may be electro-mechanical devices.

Fuel injector 66 is shown protruding into combustion chamber 30 and it is positioned to inject fuel directly into cylinder 31, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing a demand (e.g., torque or power) applied by human driver 132; a position sensor 154 coupled to brake pedal 150 for sensing a braking demand (e.g., torque) applied by human driver 132, a measurement of engine manifold pressure (MAP) from pressure sensor 122 coupled to intake manifold 44; an engine position sensor from an engine position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device. Controller 12 may also automatically start engine 10 in response to vehicle and engine operating conditions. Automatic engine starting may include starting engine 10 without input from human 132 to a device that is dedicated to receive input from human 132 for the sole purpose of starting and/or stopping rotation of engine 10 (e.g., a key switch or pushbutton). For example, engine 10 may be automatically stopped in response to driver demand torque being less than a threshold and vehicle speed being less than a threshold.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, a block diagram of an example prior art evaporative emissions system 200 is shown. Evaporative emissions system 200 includes a canister purge valve 202, a carbon filled fuel vapor storage canister 204, a canister vent valve 299, a fuel tank pressure sensor 277, a fuel tank level sensor 276, a fuel cap 230, a fuel tank pressure control valve 212, refueling valve 214, passage or conduit 255, passage or conduit 256, and passage or conduit 233.

Fuel tank pressure control valve 212 is shown in fluidic communication with carbon filled fuel vapor storage canister 204 and fuel tank 220 via conduit 233. Fuel may flow from fuel cap 230 to fuel tank 220 via filler neck pipe 231. Carbon filled fuel vapor storage canister 204 may be in selective fluidic communication with intake manifold 44 via conduit 255 and canister purge valve 202.

During refilling of fuel tank 220, the refueling valve 214 and the canister vent valve 299 may be opened so that fuel vapors may exit fuel tank 220, pass though conduit 233, and be stored in carbon filled fuel vapor storage canister 204. Air that has been stripped of hydrocarbons may flow from carbon filled fuel vapor storage canister 204 to atmosphere via passage or conduit 256 and vent valve 299 to relieve pressure in fuel tank 220.

Carbon filled fuel vapor storage canister 204 may be purged of fuel vapors by opening canister purge valve 202, fully closing fuel tank pressure control valve 212, and opening canister vent valve 299. In particular, low pressure in engine intake manifold 44 may draw fuel vapors from carbon filled canister when canister purge valve 202 and canister vent valve are opened. Fresh air drawn in from atmosphere may cause fuel vapors to desorb from the carbon filled fuel vapor storage canister.

Referring now to FIGS. 3-9, carbon filled fuel vapor storage canisters 204 and a fuel vapor manifold 402 that fluidically couples the carbon filled fuel vapor storage canisters 204 in parallel are shown. Coupling the carbon filled fuel vapor storage canisters 204 in parallel increases the fuel vapor storage capacity as compared to a single canister and the volumetric flow rate through the carbon filled fuel vapor storage canisters 204 is reduced as compared to a series arrangement of carbon filled fuel vapor storage canisters.

Figures 3, 4:
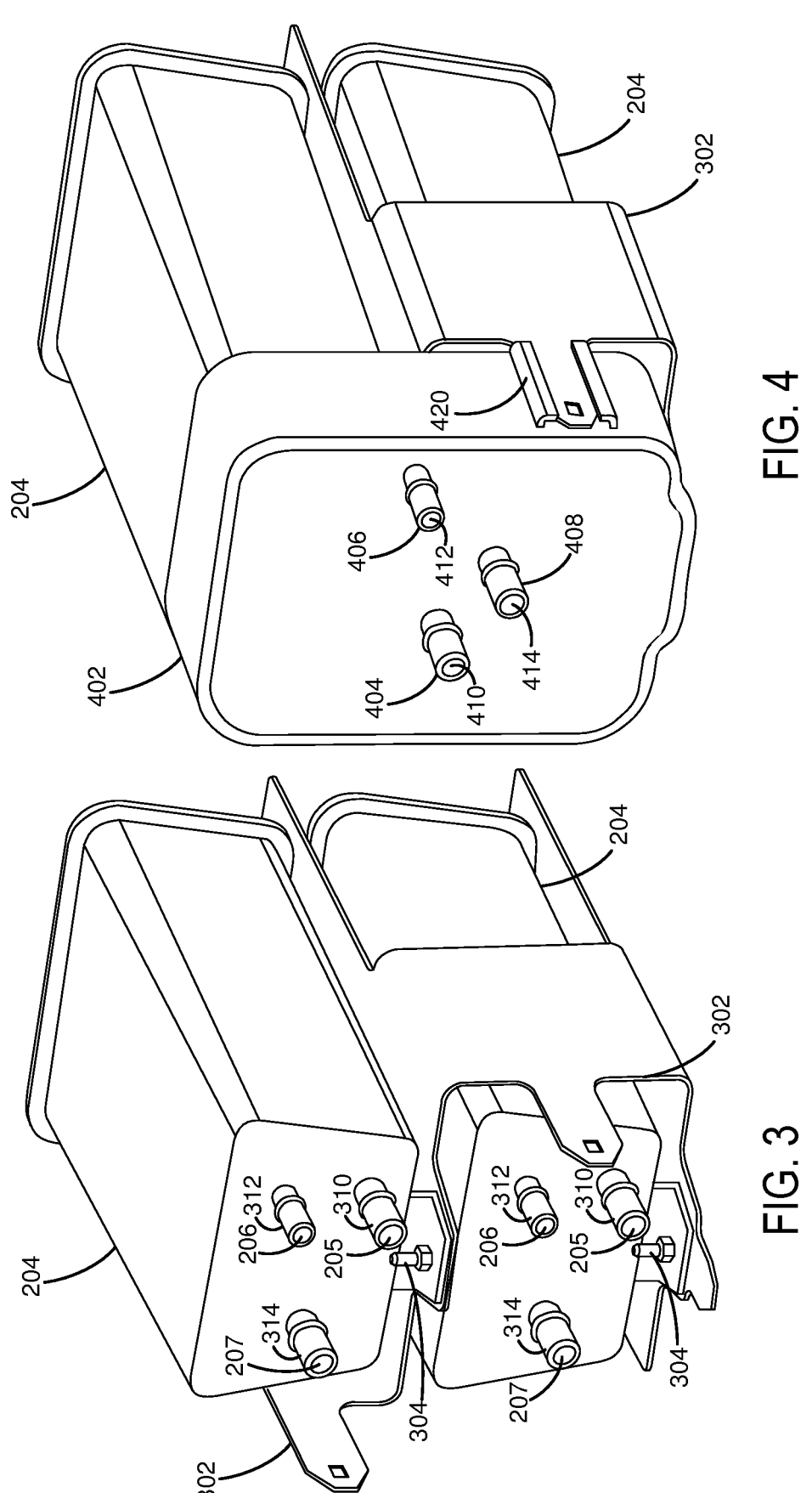
FIGS. 3-13 example evaporative emissions systems and components according to the present disclosure.

Turning now to FIG. 3, a perspective view of carbon filled fuel vapor storage canisters 204 mechanically coupled to a bracket or support 302 is shown. In this example, bracket or support 302 is mechanically coupled to carbon filled fuel vapor storage canisters 204 via fasteners 304 (e.g., bolts). Bracket or support 302 may hold carbon filled fuel vapor storage canisters 204 and a fuel vapor manifold (not shown) so as to limit motion between the same. The carbon filled fuel vapor storage canisters 204 are identical in construction.

Carbon filled fuel vapor storage canister 204 may include activated carbon 211 to store fuel vapors. Carbon filled fuel vapor storage canister 204 includes a nipple 310 with purge port 205, a nipple 312 with load port 206, and a nipple 254 with vent port 207 for allowing gases to flow into and out of carbon filled fuel vapor storage canister 204.

Referring now to FIG. 4 a perspective view of carbon filled fuel vapor storage canisters 204 with fuel vapor manifold 402 mechanically coupled thereto is shown. Fuel vapor manifold 402 is shown assembled and mechanically coupled to two carbon filled fuel vapor storage canisters 204. Fuel vapor manifold 402 includes a nipple 404 for venting, a nipple 406 for purging of fuel vapors, and a nipple 408 to fluidically couple to a load (e.g., a fuel tank or other fuel vapor source). Nipple 404 includes a vent port 410 that provides access to a vent passage or conduit (not shown) that is within fuel vapor manifold 402. Nipple 406 includes a purge port 412 that provides access to a purge passage or conduit (not shown) that is within fuel vapor manifold 402. Nipple 408 includes a load port 414 that provides access to a load passage or conduit (not shown) that is within fuel vapor manifold 402. Fuel vapor manifold 402 is also shown mechanically coupled to bracket or support 302 via guides 420.

Figure 5:
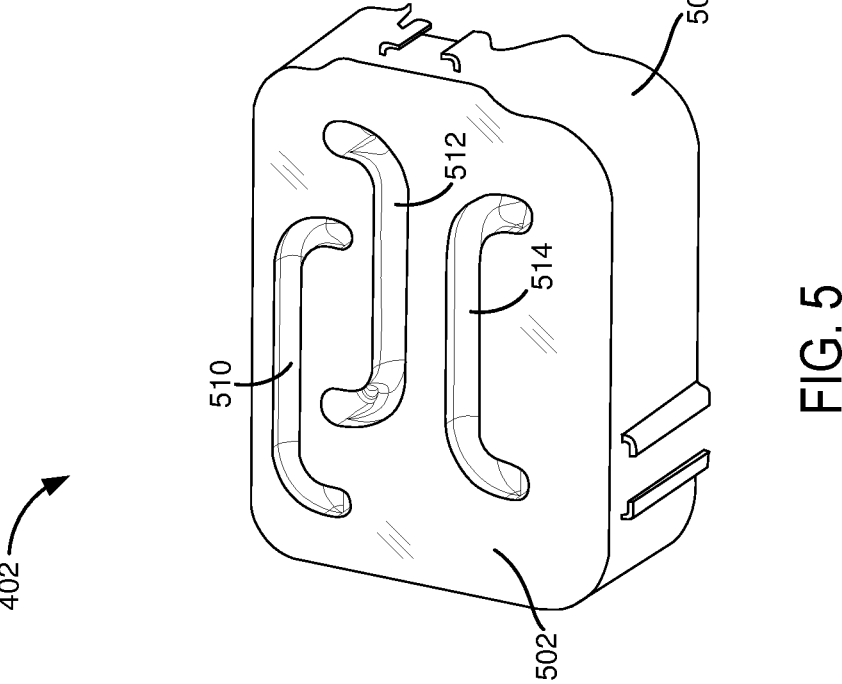

Referring now to FIG. 5, a perspective view of interior side 502 of first half 504 of fuel vapor manifold 402 is shown. The interior side 502 along with the second half (not shown) of the fuel vapor manifold 402 forms a purge passage 510, a load passage 512, and a vent passage 514. Since this fuel vapor manifold connects the ports of two carbon filled canisters in parallel, the purge passage 510 fluidically couples purge ports of two carbon filled fuel vapor storage canisters together, the load passage 512 fluidically couples load ports of the two carbon filled fuel vapor storage canisters together, and the vent passage 514 fluidically couples vent ports of the two carbon filled fuel vapor storage canisters together.

Figure 6:
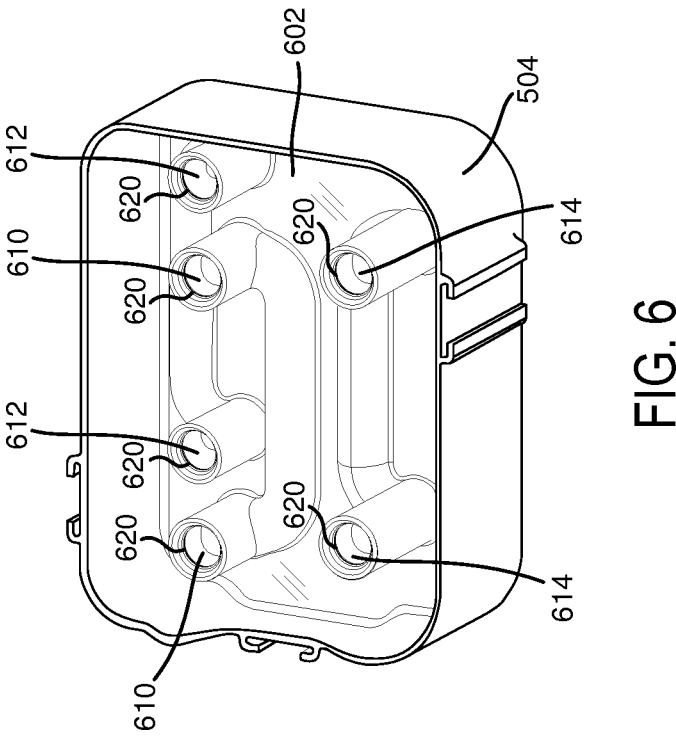

Referring now to FIG. 6, a perspective view of exterior side 602 of first half 504 of fuel vapor manifold 402 is shown. The exterior side 602 interfaces with the carbon filled fuel vapor storage canisters (e.g., 204). Visible from exterior side 602 are tubular ports configured to cover and seal with nipples of the carbon filled fuel vapor storage canisters. In particular, tubular ports 614 for sealing with vent nipples include a seal 620 (e.g., rubber, elastomer, etc.) to form an air tight seal between the fuel vapor manifold and the carbon filled fuel vapor storage canister. Likewise, tubular ports 610 for sealing with load nipples include a seal 620 to form an air tight seal between the fuel vapor manifold and the carbon filled fuel vapor storage canister. Similarly, tubular ports 612 for sealing with purge nipples include a seal 620 to form an air tight seal between the fuel vapor manifold and the carbon filled fuel vapor storage canister.

Figure 7:
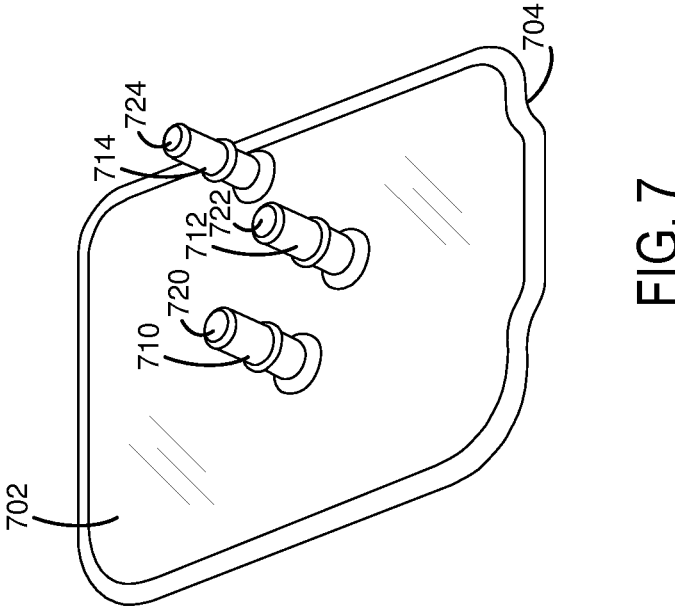

Referring now to FIG. 7, a perspective view of exterior side 702 of second half 704 of fuel vapor manifold 402 (not shown) is shown. The exterior side 702 includes three nipples for coupling to a vent, load, and purge passages or conduits. Second half 704 includes a nipple 710 with vent port 720, a nipple 712 with load port 722, and a nipple 714 with purge port 724 for allowing gases to flow into and out of fuel vapor manifold 402. The vent port 720 communicates with vent passage 514. The purge port 724 communicates with purge passage 510. The load port 722 communicates with load passage 512.

Figure 8:
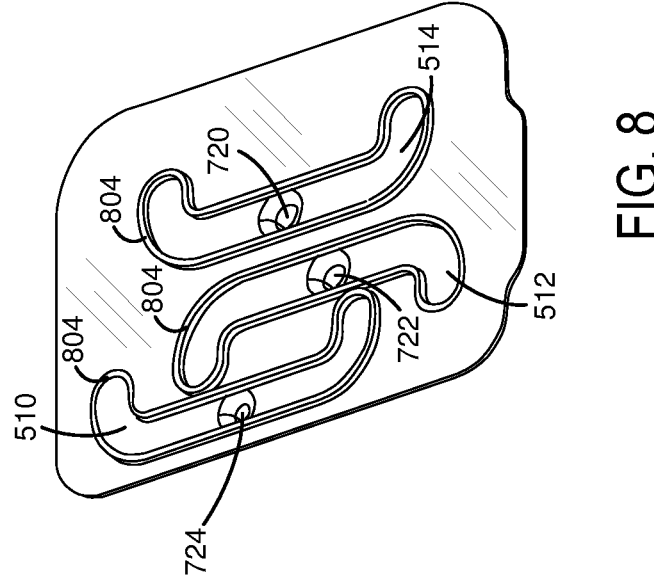

Referring now to FIG. 8, a perspective view of interior side 802 of second half 704 of fuel vapor manifold 402 (not shown) is shown. The interior side 802 forms at least a portion of vent passage 514, load passage 512, and purge passage 510 passages or conduits. Further, interior side 802 includes protrusions 804 that are welded to the first half 504. Vent port 720, load port 722, and purge port 724 are shown.

Figure 9:
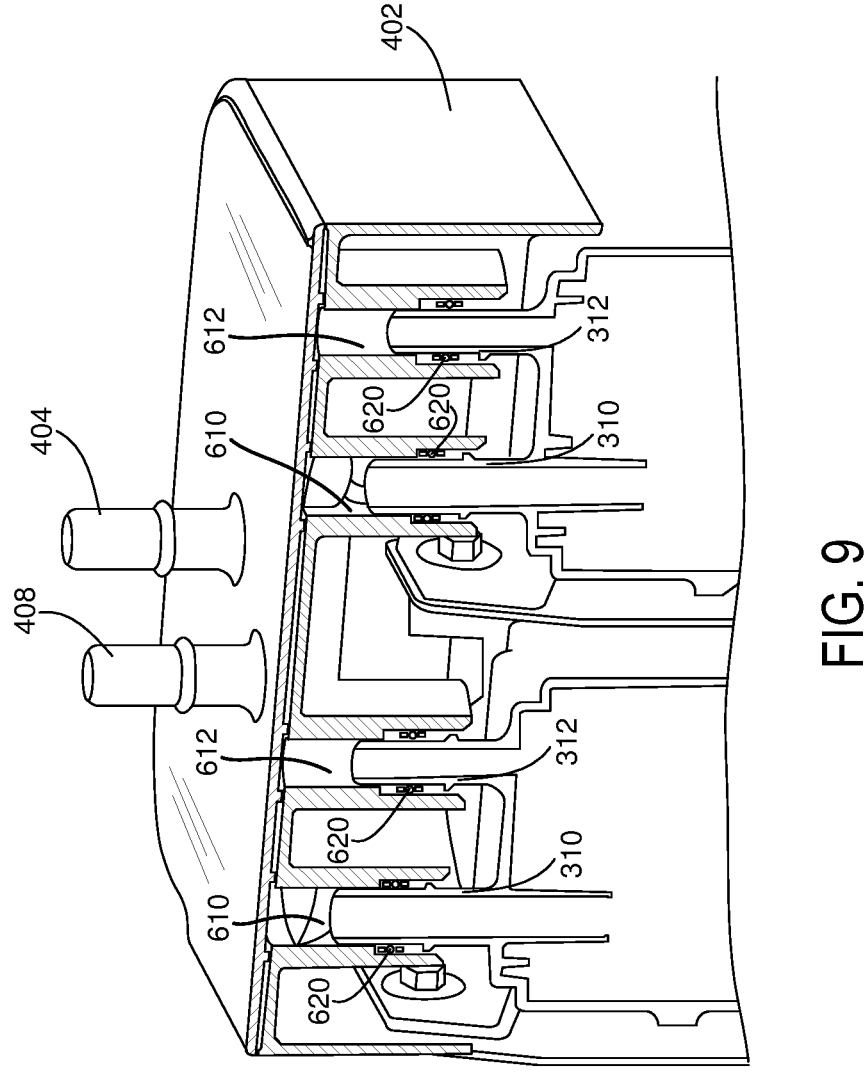

Moving on to FIG. 9, a cut-away perspective view fuel vapor manifold 402 is shown. This view shows nipples 310 interfacing with tubular ports 610 and nipples 312 interfacing with tubular ports 612. Seals 620 are also shown press fit between nipples 310 and tubular ports 610. Likewise, seals 620 are shown press fit between nipples 312 and tubular ports 612. FIG. 9 also shows how protrusions 804 of second half 704 abut first half 504.

Figure 11:
Figure 11:
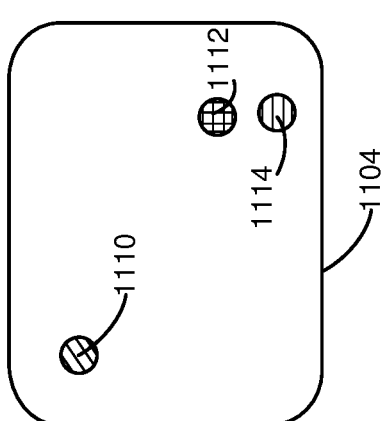
Figure 11:
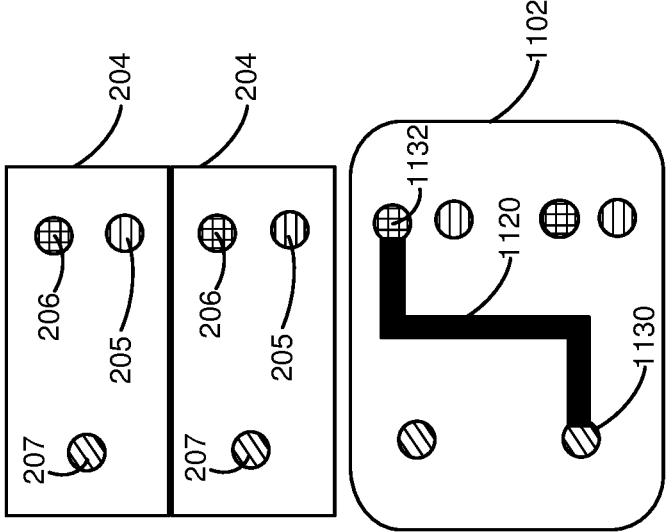
Figure 11:
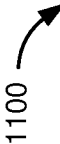

It may be appreciated that the fuel vapor manifold shown in FIGS. 4-9 is only one arrangement of a fuel vapor manifold that may be constructed. Other configurations, some but not all of which, are shown in FIGS. 11 and 13 may also be constructed to combine fuel vapor storage canisters in series, parallel, and combinations of series and parallel to increase fuel vapor storage capacity and lower fuel vapor flow rates through the respective carbon filled fuel vapor storage canisters to increase storage of fuel vapors. Further, the numbers of carbon fuel vapor storage canisters that are grouped together and combined via a fuel vapor manifold is not limited to two or three.

Figure 10:
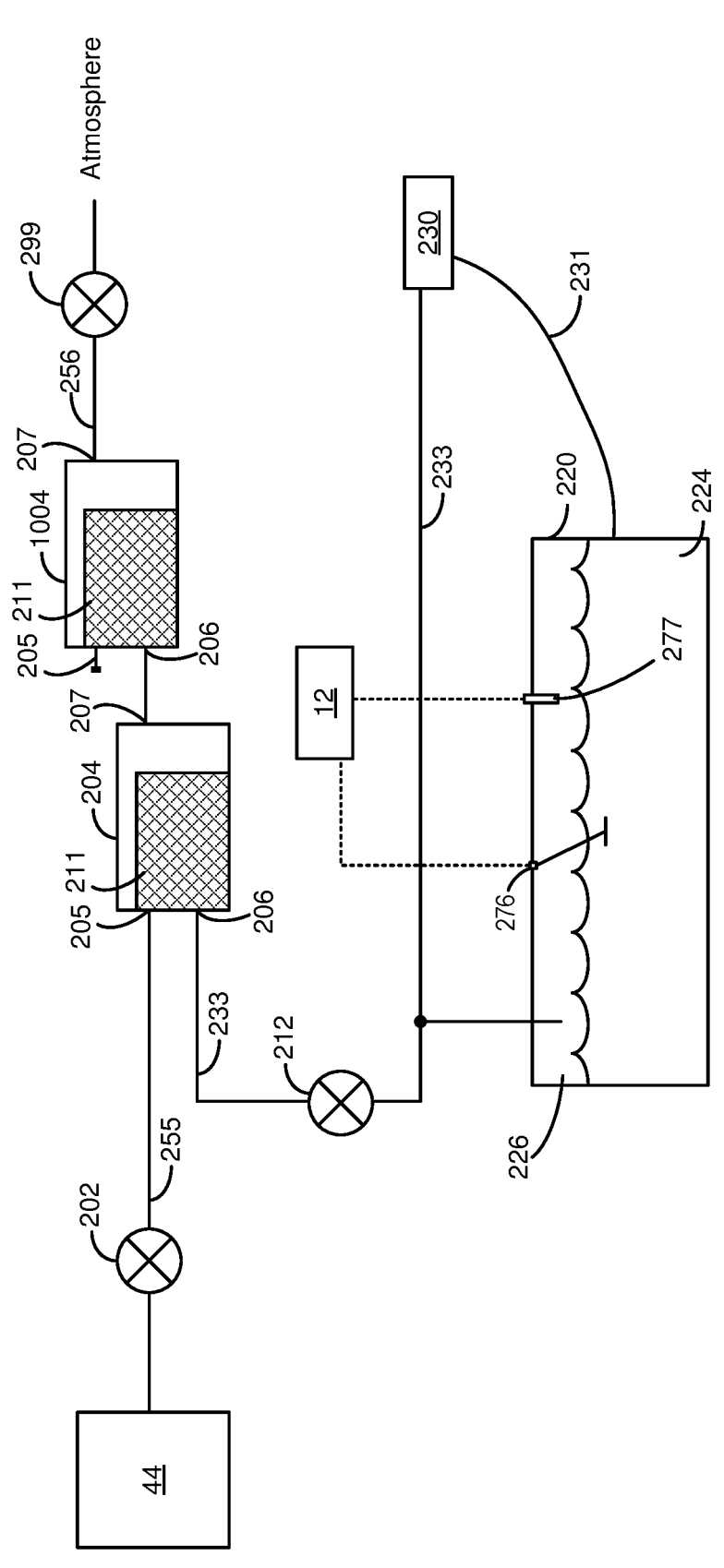

Referring now to FIG. 10, an example of two carbon filled fuel vapor storage canisters combined in series is shown. FIG. 10 includes many of the components that are shown in FIG. 2. Like components may be identified by same numerical identifiers. Therefore, for the sake of brevity, the description of like components is not repeated. However, a description of new components and differences between the systems is described.

Like FIG. 2, FIG. 10 includes a first carbon filled fuel vapor storage canister 204. Additionally, evaporative emissions system 1000 includes a second carbon filled fuel vapor storage canister 1004 that is the same as first carbon filled fuel vapor storage canister 204. Second carbon filled fuel vapor storage canister 1004 is arranged in series with first carbon filled fuel vapor storage canister 204. The series arrangement is accomplished by fluidically coupling the vent port 207 of first carbon filled fuel vapor storage canister 204 to the load port of second carbon filled fuel vapor storage canister 1004. The purge port 205 of second carbon filled fuel vapor storage canister 1004 is plugged. The vent port of second carbon filled fuel vapor storage canister 1004 is fluidically coupled with vent valve 299 and atmosphere.

The series arrangement of carbon filled fuel vapor storage canisters shown in FIG. 10 increases the volume of fuel vapor that may be trapped in the carbon filled canisters. The series arrangement also increases the resistance to flow through the carbon filled fuel vapor storage canisters, which may not be desirable if a large number of fuel vapor storage canisters are arranged in series.

Turning now to FIG. 11, a graphic representation 1100 to illustrate how connections between ports of two different canisters may be made via a fuel vapor manifold to connect the two canisters in series is shown. Two carbon filled fuel vapor storage canisters 204 are shown with vent port 207, load port 206, and purge port 205. A first half 1102 of a fuel vapor manifold is shown. The first half 1102 includes a passage 1120 that fluidically couples vent port of one carbon filled fuel vapor canister to a load port of a different carbon filled fuel vapor canister when the carbon filled fuel vapor storage canisters are mechanically coupled to the fuel vapor manifold. Passage 1120 fluidically couples a tubular vent port 1130 that interfaces with a vent port of a carbon filled fuel vapor storage canister to a tubular load port 1132 that interfaces with a load port of a second carbon filled fuel vapor storage canister.

Second half 1104 of the fuel vapor manifold is shown with vent port 1110, load port 1112, and purge port 1114. The first half 1102 and the second half 1104 may be welded together to form the fuel vapor manifold. Thus, the series connection is formed via a single passage that fluidically couples two ports of two different carbon filled fuel vapor storage canisters.

Figure 12:
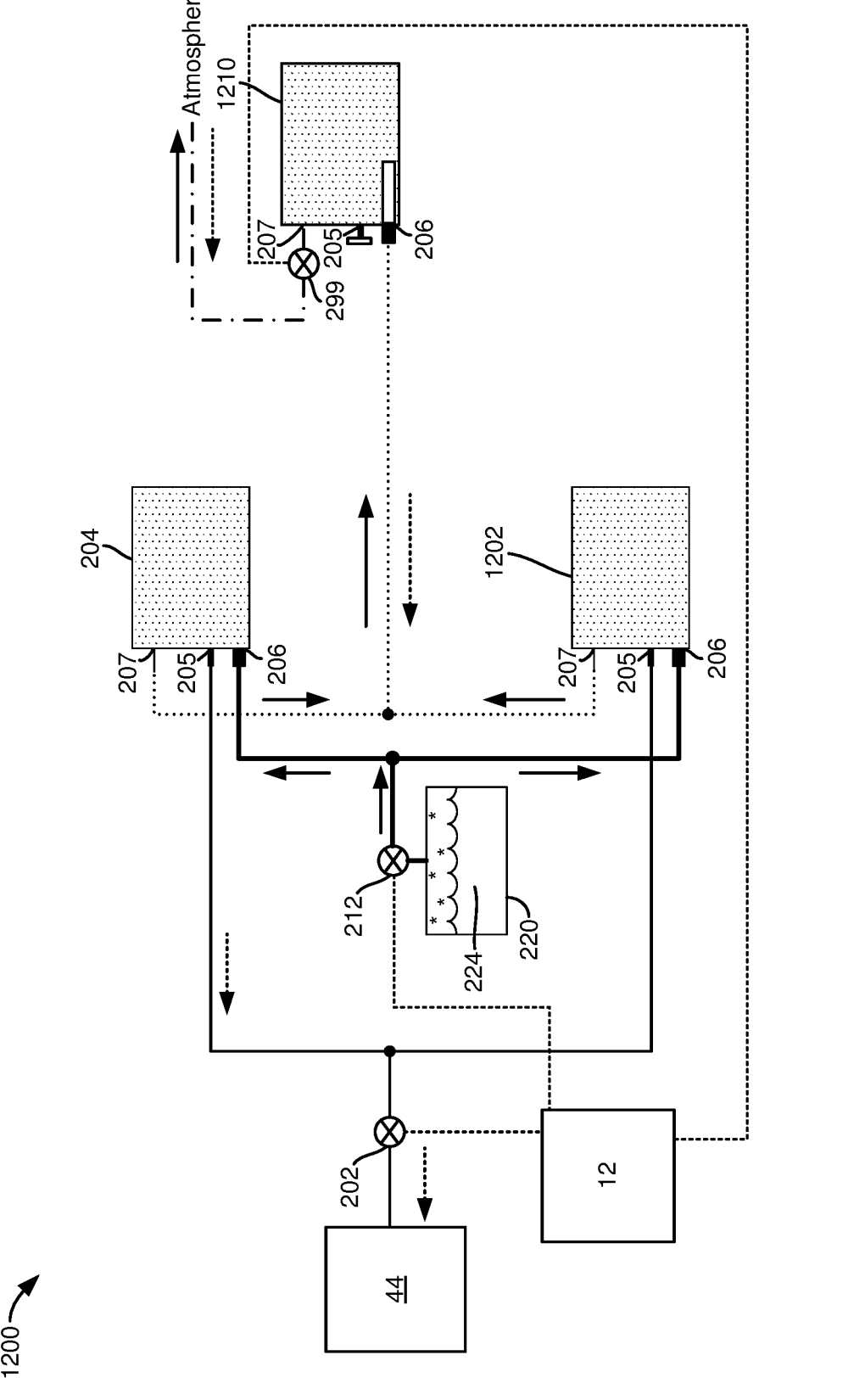

Referring now to FIG. 12, an example of two carbon filled fuel vapor storage canisters fluidically coupled in parallel followed by a series fluidic coupling to a third carbon filled fuel vapor storage canister is shown. FIG. 12 includes many of the components that are shown in FIG. 2. Like components may be identified by same numerical identifiers. Therefore, for the sake of brevity, the description of like components is not repeated. However, a description of new components and differences between the systems is described.

FIG. 12 includes a carbon filled fuel vapor storage canister 204 arranged in series with a second carbon filled fuel vapor storage canister 1202. Additionally, evaporative emissions system 1200 includes a third carbon filled fuel vapor storage canister 1210 that is arranged in series with first carbon filled fuel vapor storage canister 204 and second carbon filled fuel vapor storage canister 1202. The parallel arrangement is accomplished by fluidically coupling ports of the first carbon filled fuel vapor storage canister 204 to like ports of the second carbon filled fuel vapor storage canister 1202. For example, the vent port 207 of carbon filled fuel vapor storage canister 204 is fluidically coupled to the vent port 207 of second carbon filled fuel vapor storage canister

1202. The series arrangement is accomplished by fluidically coupling the vent ports 207 of carbon filled fuel vapor storage canister 204 and carbon filled fuel vapor storage canister 1202 to the load port of third carbon filled fuel vapor storage canister 1210. The purge port 205 of third carbon filled fuel vapor storage canister 1210 is plugged. The vent port of third carbon filled fuel vapor storage canister 1210 is fluidically coupled with vent valve 299 and atmosphere.

The parallel arrangement of two carbon filled fuel vapor storage canisters shown in FIG. 12 increases the fuel vapor storage capacity and may lower flow rates through the carbon filled fuel vapor storage canisters that are combined in parallel. The series arrangement following the parallel arrangement of carbon filled fuel vapor storage canisters shown in FIG. 12 further increases the volume of fuel vapor that may be trapped in the carbon filled canisters.

Turning now to FIG. 13, a graphic representation 1300 to illustrate how connections between ports of three different canisters may be made via a fuel vapor manifold to connect the two canisters in parallel and one canister in series with the two canisters that are arranged in parallel is shown. Three carbon filled fuel vapor storage canisters 204 are shown with vent port 207, load port 206, and purge port 205. A first half 1302 of a fuel vapor manifold is shown. The first half 1302 includes a passage 1320 that fluidically couples vent ports of two carbon filled fuel vapor storage canisters to a load port of a third carbon filled fuel vapor canister when the three carbon filled fuel vapor storage canisters are mechanically coupled to the fuel vapor manifold. Passage 1320 fluidically couples a tubular vent port 1330 that interfaces with a vent port of a carbon filled fuel vapor storage canister to tubular vent port 1332 that interfaces with a vent port of a second carbon filled fuel vapor storage canister. Passage 1320 also fluidically couples tubular vent port 1330 to tubular load port 1334 that interfaces with a load port of a third carbon filled fuel vapor storage canister. Passage 1322 fluidically couples tubular load port 1336 to tubular load port 1338 and fuel vapor manifold load port 1312. Passage 1324 fluidically couples tubular purge port 1340 to tubular purge port 1342 and fuel vapor manifold purge port 1314.

Second half 1304 of the fuel vapor manifold is shown with fuel vapor manifold vent port 1310, fuel vapor manifold load port 1112, and fuel vapor manifold purge port 1114. The first half 1302 and the second half 1304 may be welded together to form the fuel vapor manifold. Thus, both parallel and series connections are formed between three carbon filled fuel vapor storage canisters via a single fuel vapor manifold that is formed by the first half 1302 of the fuel vapor manifold and the second half 1304 of the fuel vapor manifold.

Thus the system of FIGS. 1 and 3-13 provide for a fuel vapor manifold, comprising: a first half configured to receive a first carbon filled fuel vapor storage canister and a second carbon filled fuel vapor storage canister, the first half configured to receive a first nipple of a first fuel vapor storage canister, a second nipple of the first fuel vapor storage canister, a third nipple of a second fuel vapor storage canister, and a fourth nipple of the second fuel vapor storage canister. In a first example, the fuel vapor manifold further comprises a second half, the first half welded to the second half via sonic or vibration welding. In a second example that may include the first example, the fuel vapor manifold includes where the second half includes a fifth nipple and a sixth nipple. In a third example that may include one or both of the first and second examples, the fuel vapor manifold includes where the first half is configured to receive the first nipple via a first tubular port, the first half is configured to receive the second nipple via second tubular port, the first half is configured to receive the third nipple via a third tubular port, and the first half is configured to receive the fourth nipple via a fourth tubular port. In a fourth example that may include one or more of the first through third examples, the fuel vapor manifold includes where each of the first tubular port, the second tubular port, the third tubular port, and the fourth tubular port include seals. In a fifth example that may include one or more of the first through fourth examples, the fuel vapor manifold includes here the first half and the second half form at least one sealed passage between the first half and the second half. In a sixth example that may include one or more of the first through fifth examples, the fuel vapor manifold includes where the at least one sealed passage extends between the first nipple and the third nipple. In a seventh example that may include one or more of the first through sixth examples, the fuel vapor manifold includes where the second half includes at least one protrusion that is welded to the first half.

The system of FIGS. 1 and 2-13 also provides for a fuel vapor storage system, comprising: a first carbon filled fuel vapor storage canister including a first nipple and a second nipple; a second carbon filled fuel vapor storage canister including a third nipple and a fourth nipple; and a fuel vapor manifold configured to receive the first carbon filled fuel vapor storage canister and the second carbon filled fuel vapor storage canister, the fuel vapor manifold of clam shell construction including a first half and a second half, the first half configured to receive the first nipple, the second nipple, the third nipple, and the fourth nipple, the second half including a fifth nipple and a sixth nipple. In a first example, the fuel vapor storage system includes where the fifth nipple and the sixth nipple include ports into passages formed via the first half and the second half. In a second example that may include the first example, the fuel vapor storage system includes where the first half includes one or more tubular ports configured to receive at least the first nipple. In a third example that may include one or both of the first and second examples, the fuel vapor storage system further comprises seals within the one or more tubular ports. In a fourth example that may include one or more of the first through third examples, the fuel vapor storage system further comprises a bracket configured to hold the first carbon filled fuel vapor canister, the second carbon filled fuel vapor canister, and the fuel vapor manifold.

Referring now to FIG. 14, an example method 1400 for operating a vehicle that includes an evaporative emissions system is shown. At least portions of method 1400 may be included in and cooperate with a system as shown in FIGS. 1-14 as executable instructions stored in non-transitory memory. The method of FIG. 14 may cause the controller to actuate the actuators in the real world and receive data and signals from sensors described herein when the method is realized as executable instructions stored in controller memory.

At 1402, method 1400 judges whether or not a vehicle's fuel tank is being filled. Method 1400 may judge that the vehicle's fuel tank is being filled when a fuel door is open, when pressure in the fuel tank is rising at a rate that is above a threshold rate, or in response to other vehicle conditions. If method 1400 judges that the vehicle's fuel tank is being refilled, the answer is yes and method 1400 proceeds to 1404.

At 1404, method 1400 directs gases (e.g., a mixture of air and fuel vapor) from the fuel tank to a fuel vapor manifold.

The fuel vapor manifold may allow carbon filled fuel vapor storage canisters to be arranged in series and/or parallel to store fuel vapors. A few examples of fuel vapor manifolds are included herein, but these fuel vapor manifolds are not intended to be limiting and other variations may be expected. In order to flow gases to the fuel vapor manifold, method 1400 may open one or more valves (e.g., a fuel tank pressure control valve and a canister vent valve). Method 1400 proceeds to 1406.

At 1406, method 1400 distributes gases to carbon filled fuel vapor storage canisters. The gases may be distributed via the fuel vapor manifold to carbon filled fuel vapor storage canisters that are arranged in series and/or parallel. Method 1400 proceeds to 1408.

At 1408, method 1400 stores fuel vapors in one or more carbon filled fuel vapor storage canisters. The fuel vapors may be stored via activated carbon. Air that has been stripped of hydrocarbons may be released to atmosphere. Method 1400 proceeds to 1410.

At 1410, method 1400 judges whether or not filling of the fuel tank is complete. Method 1400 may judge that filling of the fuel tank is complete when a fuel door is closed, when pressure in the fuel tank ceases increasing, or based on other conditions. If method 1400 judges that fuel tank refilling is complete, the answer is yes and method 1400 proceeds to 1412. Otherwise, the answer is no and method 1400 returns to 1404.

At 1412, method 1400 ceases flowing gases to the fuel vapor manifold. Method 1400 may close one or more valves to cease flowing gases to the fuel vapor manifold. Method 1400 proceeds to exit.

At 1420, method 1400 judges whether or not the vehicle's engine is running (e.g., rotating and combusting fuel) and if purging of fuel vapors from carbon filled fuel vapor storage canisters is permitted. If so, the answer is yes and method 1400 proceeds to 1422. Otherwise, the answer is no and method 1400 proceeds to 1428.

At 1422, method 1400 directs fresh air to the carbon filled fuel vapor storage canisters to liberate the canisters of fuel vapor. The fresh air may be directed via the fuel vapor manifold and by opening one or more valves (e.g., a canister vent valve and a canister purge valve). Method 1400 proceeds to 1424.

At 1424, method 1400 directs fuel vapor to the engine where they may be combusted. The fuel vapors are directed to the engine from the fuel vapor storage canisters via the fuel vapor manifold. Method 1400 proceeds to 1426.

At 1426, method 1400 judges whether or not the carbon filled fuel vapor storage canisters are clean of fuel vapors. In one example, method 1400 may sample hydrocarbons flowing from the canisters to determine whether or not the carbon filled fuel vapor storage canisters are clean. If method 1400 judges that the carbon filled fuel vapor storage canisters are clean, the answer is yes and method 1400 proceeds to 1428. Otherwise, method 1400 returns to 1422.

At 1428, method 1400 ceases flowing gases to the fuel vapor manifold. Method 1400 may close one or more valves to cease flowing gases to the fuel vapor manifold. Method 1400 proceeds to exit.

In this way, method 1400 may distribute gases to a plurality of carbon filled fuel vapor storage canisters that are arranged in series and/or in parallel to store larger amounts of fuel vapors that may be accompany filling a larger fuel tank. The gases may be distributed via a hydrocarbon manifold as described herein or other anticipated variants.

Thus, the method of FIG. 14 provides for a method for operating a vehicle, comprising: arranging a plurality of carbon filled fuel vapor storage canisters in parallel and series; and via a controller, indicating a presence or absence of degradation for each of the plurality of carbon filled fuel vapor storage canisters according to a state of an oxygen sensor and a plurality of ranges of air amounts. In a first example, the method includes where arranging the plurality of carbon filled fuel vapor storage canisters in parallel and series includes arranging two carbon filled fuel vapor storage canisters in parallel, and arranging one carbon filled fuel vapor storage canister in series with the two carbon filled fuel vapor storage canisters. In a second example that may include the first example, the method includes where the flow ranges quantify an amount of air that has flowed through the plurality of carbon filled fuel vapor storage canisters. In a third example that may include one or both of the first and second examples, the method includes where the state of the oxygen sensor is indicating a lean air-fuel mixture. In a fourth example that may include one or more of the first through third examples, the method includes where the state of the oxygen sensor switches from indicating a rich air-fuel mixture to indicating a lean air-fuel mixture. In a fifth example that may include one or more of the first through fourth examples, the method further comprises providing an open canister purge valve, two closed canister vent valves, and one open canister vent valve in response to a request to diagnose operation of the plurality of carbon filled fuel vapor storage canisters in a first diagnostic phase. In a sixth example that may include one or more of the first through fifth examples, the method further comprises providing an open canister purge valve, one closed canister vent valve, and two open canister vent valves in response to the request to diagnose operation of the plurality of carbon filled fuel vapor storage canisters in a second diagnostic phase. In a seventh example that may include one or more of the first through sixth examples, the method includes where the plurality of ranges of air amounts are air amounts that flow into the carbon filled fuel vapor storage canisters.

Note that the example control and estimation routines included herein can be used with various engine and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fuel vapor storage system, comprising:
   a first carbon filled fuel vapor storage canister including a first nipple and a second nipple;
   a second carbon filled fuel vapor storage canister including a third nipple and a fourth nipple; and
   a fuel vapor manifold configured to receive the first carbon filled fuel vapor storage canister and the second carbon filled fuel vapor storage canister, the fuel vapor manifold including a first half and a second half, the first half including a plurality of tubular ports configured to receive the first nipple, the second nipple, the third nipple, and the fourth nipple, respectively, the second half of the fuel vapor manifold including a fifth nipple and a sixth nipple.

2. The fuel vapor storage system of claim 1, where the fifth nipple and the sixth nipple include ports into passages defined between the first half and the second half of the fuel vapor manifold.

3. The fuel vapor storage system of claim 2, where an interior side of the second half of the fuel vapor manifold includes protrusions welded to the first half of the fuel vapor manifold.

4. The fuel vapor storage system of claim 3, further comprising a seal within each of the plurality of tubular ports.

5. The fuel vapor storage system of claim 1, further comprising a bracket configured to hold the first carbon filled fuel vapor storage canister, the second carbon filled fuel vapor storage canister, and the fuel vapor manifold.

6. The fuel vapor storage system of claim 2, where the first carbon filled fuel vapor storage canister includes a seventh nipple, the second carbon filled fuel vapor storage canister includes an eighth nipple, and the second half of the fuel vapor manifold includes a ninth nipple, and where the fifth nipple, the sixth nipple, and the ninth nipple include ports into the passages defined between the first half and the second half of the fuel vapor manifold.

7. The fuel vapor storage system of claim 6, where the passages include a vent passage, a load passage, and a purge passage.

8. The fuel vapor storage system of claim 7, where the ports into the passages include a vent port of the fifth nipple into the vent passage, a load port of the sixth nipple into the load passage, and a purge port of the ninth nipple into the purge passage.

9. The fuel vapor storage system of claim 8, where there is no fluidic communication between the vent passage, the load passage, and the purge passage within the fuel vapor manifold.

10. The fuel vapor storage system of claim 8, where the first nipple includes a first port fluidly coupled to the vent passage, the third nipple includes a second port fluidly coupled to the vent passage, the second nipple includes a third port fluidly coupled to the load passage, the fourth nipple includes a fourth port fluidly coupled to the load passage, the seventh nipple includes a fifth port fluidly coupled to the purge passage, and the eighth nipple includes a sixth port fluidly coupled to the purge passage.

* * * * *